United States Patent
Larsson et al.

(10) Patent No.: US 12,275,804 B2
(45) Date of Patent: Apr. 15, 2025

(54) MELT-PROCESSED MATERIAL WITH HIGH CELLULOSE FIBER CONTENT

(71) Applicant: Tetra Laval Holdings & Finance S.A., Pully (CH)

(72) Inventors: Per Larsson, Stockholm (SE); Giada Lo Re, Stockholm (SE)

(73) Assignee: Tetra Laval Holdings & Finance S.A. (CH)

( * ) Notice: Subject to any disclaimer, the term of this patent is extended or adjusted under 35 U.S.C. 154(b) by 183 days.

(21) Appl. No.: 17/984,438

(22) Filed: Nov. 10, 2022

(65) Prior Publication Data

US 2023/0078455 A1    Mar. 16, 2023

Related U.S. Application Data

(63) Continuation of application No. 16/479,207, filed as application No. PCT/SE2018/050039 on Jan. 18, 2018, now Pat. No. 11,518,821.

(30) Foreign Application Priority Data

Jan. 18, 2017 (SE) .................................... 1750041-4

(51) Int. Cl.
| | | |
|---|---|---|
| *C08L 1/08* | (2006.01) | |
| *C08B 15/02* | (2006.01) | |
| *C08J 5/18* | (2006.01) | |
| *C08L 23/04* | (2006.01) | |
| *C08L 23/10* | (2006.01) | |

(52) U.S. Cl.
CPC ................. *C08B 15/02* (2013.01); *C08J 5/18* (2013.01); *C08J 2301/04* (2013.01); *C08J 2323/06* (2013.01); *C08J 2323/12* (2013.01); *C08L 1/08* (2013.01); *C08L 23/04* (2013.01); *C08L 23/10* (2013.01)

(58) Field of Classification Search
None
See application file for complete search history.

(56) References Cited

U.S. PATENT DOCUMENTS

2007/0004826 A1  1/2007  Bayer et al.
2018/0194863 A1  7/2018  Larsson

FOREIGN PATENT DOCUMENTS

| CN | 102241779 A | 11/2011 |
| CN | 103172912 A | 6/2013 |
| CN | 106283641 A | 1/2017 |
| JP | H11-323783 A | 11/1999 |
| JP | 2018-532052 A | 11/2018 |
| JP | 2019-500448 A | 1/2019 |
| JP | 2020-500267 A | 1/2020 |
| WO | 1674502 A1 | 6/2006 |

(Continued)

OTHER PUBLICATIONS

Bengtsson et al., "Extrusion and mechanical properties of highly filled cellulose fibre-polypropylene composites", Composites: Part A 38 (2007) 1922-1931.

(Continued)

*Primary Examiner* — Richard A. Huhn
(74) *Attorney, Agent, or Firm* — Quarles & Brady LLP (57) ABSTRACT

The present invention relates to a product comprising cellulose fibers wherein the cellulose fibers are at least partly modified to contain dialcohol cellulose and a melt-processing method of preparing the same.

20 Claims, 1 Drawing Sheet (56) References Cited

FOREIGN PATENT DOCUMENTS

WO    WO 2017/003364    1/2017

OTHER PUBLICATIONS

Extended European Search report issued for EP 22155013, dated May 20, 2022, 7 pgs.
International Search Report for PCT/SE2018/050039, dated Mar. 13, 2018, 1 page.
Kasai et al., "Mechanical properties of films made from dialcohol cellulose prepared by homogeneous periodate oxidation", Cellulose (2014) 21:769-776.
Larsson et al., "Ductile All-Cellulose Nanocomposite Films Fabricated from Core-Shell Structured Cellulose Nanofibrils", Biomacromolecules 2014, 15, 2218-2223.
Larsson, et al., "Towards natural-fibre-based thermoplastic films produced by conventional papermaking", Green Chemistry, 18, 3324-3333, (2016).
Morooka et al., "Periodate Oxidation of Cellulose by Homogeneous Reaction", Journal of Applied Polymer Science 38 Sep. 5, 1989, No. 5, 10 pages.
Office Action issued for JP 2019-539827 dated Jan. 18, 2022 (English translation) 4 pgs.
Office Action issued for CN 201880007569.7 dated Mar. 24, 2021 (with English translation) 8 pgs.
Reddy et al., "Biobased plastics and bionanocomposites: Current status and future opportunities", Progress in Polymer Science 38 (2013) 1653-1689.

MELT-PROCESSED MATERIAL WITH HIGH CELLULOSE FIBER CONTENT

CROSS-REFERENCE TO RELATED APPLICATIONS

This application is a Continuation of U.S. application Ser. No. 16/479,207, now entitled "MELT-PROCESSED MATERIAL WITH HIGH CELLULOSE FIBER CONTENT", filed on Jul. 18, 2019, which application claims priority to and is a 35 U.S.C. § 371 national phase application of PCT/SE2018/050039 (WO/2018/135994), filed on Jan. 18, 2018 entitled "MELT-PROCESSED MATERIAL WITH HIGH CELLULOSE FIBER CONTENT", which application claims priority to and the benefit of Sweden Patent Application No. 1750041-4, filed Jan. 18, 2017, the disclosures of which are incorporated herein by reference in their entirety. Any disclaimer that may have occurred during the prosecution of the above-referenced applications is hereby expressly rescinded, and reconsideration of all relevant art is respectfully requested.

FIELD OF THE INVENTION

The present invention relates to melt-processed products of dialcohol cellulose and a method of preparing the products. The present invention facilitates the preparation of extruded and/or injection molded products having high cellulose content.

BACKGROUND

Cellulose is probably the most abundant biopolymer on Earth, and it is considered to be an important component in a future, sustainable and bio-based economy.

A problem with cellulose is the difficulty of processing the cellulose for example by various melt-processing techniques. Extrusion and injection molding of cellulose and especially cellulose fibers requires a high content of a second thermoplastic polymer to facilitate the process. These composites or mixtures of cellulose and a second polymer have, however, shown to suffer from pullout and debonding between the cellulose fibers and the second polymer, as well as formation of agglomerates.

Bengtsson et al. (Composites: Part A, 38 (2007), 1922-1931) disclose a cellulose fiber reinforced polypropylene composite with up to 60% of cellulose fibers. The composite was prepared by extrusion by preparing pellets of the cellulose before compounding it with the polypropylene.

US2007/0004826 discloses a composition of cellulose ether, a plasticizer and a defoamer where the composition may be used in extrusion of inorganic compositions.

Larsson et al. (Green Chemistry, 18 (2016), 3324-3333) and PCTSE2016/050663 describe a way of preparing dialcohol cellulose by partly oxidizing the cellulose fibers (to dialdehyde cellulose) followed by a complete reduction of the formed aldehydes, forming dialcohol cellulose. The obtained material was used to prepare a material by conventional papermaking techniques.

Still there is no disclosure of melt-processing high-cellulose-containing material, for example by extrusion or injection molding.

SUMMARY OF THE INVENTION

The object of the present invention is to overcome the drawbacks of the prior art by providing a cellulose-fiber-containing product where the cellulose has been at least partly modified to dialcohol cellulose.

The main aspect of the present invention relates to a product according to claim 1.

In a second aspect the present invention relates to a method of preparing the product according to the present invention wherein the method comprises
 a) providing a material comprising cellulose fibers wherein the cellulose fibers are at least partly modified to contain dialcohol cellulose and wherein the amount of the modified cellulose fibers in the melt-processed product is more than 60 wt %; and
 wherein the degree of conversion of the at least partly modified cellulose to dialcohol cellulose, based on the total number of oxidizable C2-C3 bonds in the cellulose material, is at least 10%;
 b) optionally letting the material sorb moisture or water for a sufficient period of time or until sufficient amount of water or moisture have been sorbed; and
 c) melt-processing the material into the product.

In a third aspect, the present invention relates to a material comprising cellulose fibers wherein the cellulose fibers are at least partly modified into dialcohol cellulose and wherein the amount of the modified cellulose fibers in the material is more than 60 wt %;
 wherein the degree of conversion of the at least partly modified cellulose to dialcohol cellulose, based on the total number of oxidizable C2-C3 bonds in the cellulose material, is at least 10%;
 and wherein the material optionally has absorbed 5-40 wt % moisture or water.

In a fourth aspect, the present invention relates to a method of melt processing a cellulose-fiber-containing product wherein the method comprises:
 a) providing a material comprising modified cellulose fibers wherein the modified cellulose fibers are at least partly modified into dialcohol cellulose;
 b) letting the material sorb moisture or water for a sufficient period of time or until sufficient amount of water or moisture have been sorbed; and
 c) melt processing the material into a product.

In a fifth aspect the present invention relates to the use of the product as gas barrier, such as oxygen and/or water vapor barrier.

In a sixth aspect the present invention relates to the use of the product as a liquid barrier such as water barrier.

In a seventh aspect the present invention relates to a material comprising cellulose fibers wherein the cellulose fibers are at least partly modified into dialcohol cellulose and wherein the material have absorbed 5-40 wt % moisture or water.

All the embodiments disclosed herein relates to all the aspects unless stated otherwise.

DETAILED DESCRIPTION OF THE INVENTION

In the present application the terms "sorb" or "sorption" encompasses both adsorption and absorption.

In the present application the term "cellulose" also encompasses hemicellulose unless stated otherwise.

In the present application the term "melt-process" denotes a process where the temperature is high enough to cause the processed material to flow in a similar way to molten thermoplastics.

The present invention aims at providing melt-processed products of cellulose or cellulose-containing material, and thereby the amount of fossil-derived plastics may be reduced. It is well known that cellulose is very hard to mold or shape, for example through extrusion or injection molding, into a product. The skilled person knows that polymeric material soften by moisture uptake or at elevated temperature, however he also knows that it is not the same thing as being melt processable. In order to overcome this problem a common way has been to use a mixture of cellulose and another thermoplastic polymer. The present invention facilitates the preparation of products comprising up to 100% of cellulosic fiber material and there is no need to add any additive such as plasticizer during the processing.

Cellulose is a polysaccharide found in the primary cell wall of plants and cellulose and cellulose derivatives may be found in a variety of different products such as paper, paper board, textiles, implants and gunpowder. The cellulose of the present invention may be of lignocellulosic origin such as from wood.

The cellulose fibers used when preparing the material and product according to the present invention may have but is not limited to an average diameter of at least 1 µm such as at least 5 µm, or at least 8 µm, or at least 12 µm. The average length of the fibers is preferably at least 0.3 mm, such as 0.3-4 mm.

It needs to be emphasized that there is a major difference between cellulose fibers and fibrils or nanofibrils. Fibrils have a diameter of a few nanometers while fibers are in the micrometer range i.e. fibers are thousand times bigger. Therefore many properties that fibrils exhibit are not seen for fibers.

The cellulose may be any suitable cellulose such as cellulose obtained from pulping. In one embodiment the cellulose is obtained from the Kraft process. In another embodiment the cellulose is obtained from bleached pulp from the Kraft process. The cellulose obtained from a pulping process usually also contains hemicellulose. However, the hemicellulose will also undergo the modification as or similarly as described herein.

The Melt-Processed Product

The product according to the present invention is a molded or cast product obtained by a melt-process which may be selected from but is not limited to injection molding, extrusion, extrusion casting, extrusion injection molding, extrusion coating or extrusion compression molding. The material used in the present invention is extrudable, which facilitates preparation of products having a more complex profile or cross-section by extrusion or injection molding or a combination of melt-processing operations, of the cellulose-containing material.

By modifying the cellulose fibers partly into dialcohol cellulose the cellulose containing material will be more easily melt-processed. The modification into dialcohol cellulose may be done in two steps where the first step is oxidizing the cellulose on/in the fibrils constituting the cellulose fiber to dialdehyde cellulose to a desired extent. This is mainly a heterogeneous reaction performed in a fiber suspension. A preferred oxidation agent is a periodate such as sodium periodate. The dialdehyde groups on the cellulose are then reduced to dialcohol cellulose, for example by using a hydride such as a boron hydride, for example sodium borohydride.

The modification of oxidizable C2-C3 bonds of the glucose monomer units of the cellulose molecules takes place firstly at the surface of the cellulose nanofibrils constituting the fibers. As the modification proceeds, it is believed that the modified nanofibrils obtain a core-shell structure, and thereby, from the dialcohol shell, get mechanical and physical properties that resemble the properties of thermoplastic polymers, which are advantageous in the processes of extrusion and injection molding.

The oxidation time depends partly on the oxidation agent, the concentration of the same, as well as the cellulose concentration and the temperature where higher concentration and higher temperature decreases the oxidation time. As a non-limiting example the oxidation time may be 0.1-40 hours such as 1-35 hours, 10-30 hours, or 20-25 hours. In one embodiment the oxidation time is 0.5-4 hours such as 1-2 hours. The oxidation temperature may be but is not limited to 20-60° C., such as 30-50° C. However, longer oxidation time results in a higher degree of modification which in turn may make the material more susceptible to discoloration during the melt-processing step.

When determining the degree of modification or conversion of the cellulose into dialcohol cellulose the first step is to determine the degree of conversion into dialdehydes. This is done by using the method "carbonyl content determination" described below. The conversion is given as a percentage of the maximum amount of conversion assuming pure cellulose as starting material. In the second step all the aldehydes are assumed to be converted into alcohols (which also can be supported by a second carbonyl content determination) unless there is any indication or description stating the opposite.

The degree of conversion of cellulose to dialdehyde cellulose prior to reduction to dialcohol cellulose is preferably above 13%, such as above 18% or above 20%, based on the total number of oxidizable C2-C3 bonds in the natural cellulose material. Further, the degree of conversion may be below 60%, such as below 50%. In one embodiment, the degree of conversion to dialdehyde cellulose is between 22% and 49%, such as between 24% and 45%. The degree of modification or conversion of the cellulose fibers into dialcohol cellulose may be at least 10%, or at least 20%, or at least 30%, or at least 32%, or at least 40%, or at least 50%, or at least 60%, preferably less than 100%, or less than 90%, or less than 80% or less than 70%. In one embodiment the degree of modification is 30-60% such as 32-40% or 40-50%.

As the degree of conversion to dialcohol cellulose approach 100%, the cellulose will be dissolved and partly or fully take a non-fibrous form. This state is possible to work with but less desirable, since it requires that the cellulose is re-flocculated into solid cellulose material, which is a non-trivial extra process step. When solidified from solution, the cellulose will be more in the form of a powder than fibers. From a process point of view, the optimal degree of conversion of the cellulose appears to be at from 25 to 60% such as 35-50%.

The fiber suspension used in the method for preparing the fibers of the material may be a suspension of beaten fibers.

The amount of the modified cellulose fibers in the product may be 1-100 wt %. In one embodiment the amount is 10 wt % or more, or 20 wt % or more, or 30 wt % or more, 40 wt % or more, or 50 wt % or more, or 60 wt % or more, or 61 wt % or more, or 63 wt % or more, or 65 wt % or more, or 70 wt % or more, or 75 wt % or more, or 80 wt % or more, or 85 wt % more, or 90 wt % or more, or 95 wt % or more, or 100 wt %.

When the amount of modified cellulose fiber is less than 100 wt % the product may further contain at least one second polymer which may be a thermoplastic polymer and may be selected from a natural polymer, a natural polymer derivative, a polyolefin, a polyethylene vinyl alcohol co-polymer, a polyester, polyurethane, epoxy resin, a polyacrylic acid, a poly(meth)acrylic acid or a polyamide, or a mixture or a co-polymer of two or more of any said polymers. In one embodiment one of the second polymers is a thermoset. In one embodiment the thermoset is selected from polyester, polyurethane and epoxy resin. In one embodiment one of the second polymers is polyethylene or polypropylene. In another embodiment one of the second polymers is natural cellulose, hemi cellulose or starch, or a derivative of natural cellulose, hemi cellulose or starch. In another embodiment one of the second polymers is natural cellulose. In another embodiment one of the second polymers is cellulose derivative. In another embodiment one of the second polymers is a co-polymer of a polyolefin and an acrylic or methacrylic acid. In another embodiment one of the second polymers is poly(ethylene acrylic acid) (EAA). In another embodiment one of the second polymers is polyethylene methacrylic acid. In another embodiment one of the second polymers is polyethylene terephthalate (PET). In one embodiment one of the second polymers is poly(butylene terephthalate) (PBT). In one embodiment one of the second polymers is poly(ether ether ketone) (PEEK). In one embodiment one of the second polymers is a Nylon (polyamide) such as Nylon 11, Nylon 12, Nylon 6 or Nylon 66. In one embodiment one of the second polymers is a biodegradable polyester such as polycaprolactone, poly lactic acid or polyglycolic acid. In one embodiment the product contains two or more second polymers.

The total amount of the second polymers may be 1-99 wt %. In one embodiment the total amount of the second polymers is 10 wt % or more, or 20 wt % or more, or 30 wt % or more, 40 wt % or more, or 50 wt % or more. In another embodiment the total amount of the second polymer is more than 1 wt % but less than 40 wt %, or less than 35 wt %, or less than 30 wt %, or less than 25 wt %. In another embodiment the total amount of the second polymer is 10-50 wt % such as 39-12 wt %, or 35-15 wt %, or 20-30 wt %.

The product may further contain any suitable additive such as a plasticizer, cross linking agent, reinforcement fibers, compatibilizer, fillers, defoamer or pigment. In one embodiment the product comprises a cross linking agent such as a polyol, polyaldehydes, polycarboxylic acid, polyamine, isocynate, 2,2'-azobis(2-methylpropionitrile) (AIBN), urea, formal aldehyde and bisphenol A. The reinforcement fibers may be selected from glass fiber or carbon fiber. In one embodiment the product comprises a filler such as a mineral filler. However the product may also be essentially free from any additive. In one embodiment the product is essentially free from any plasticizer and compatibilizer. In one embodiment the product is essentially free from any cross-linking agents. In one embodiment the amount of additive is 0.5 to 10 wt %. In one embodiment the amount is less than 8 wt %, or less than 6 wt %, or less than 4 wt %, or less than 2 wt % but preferably at least 1 wt %.

The product may be a cap, closure, closure device, package top, opening, toy, container, construction part, interior decoration or an automotive part. Automotive parts may be interior or under hood parts, structural parts and non-load bearing applications. As construction part or interior decoration the product may be used as a profile, strip, edging or skirting-board.

The mechanical properties may be tailored by varying the type and amount of the second polymer and/or by changing the degree of modification. For example by increasing the content of the modified cellulose when mixed with a soft polymer, such as EAA, the obtained material showed an increase in the elastic modulus and the yield strength significantly.

Without being bound by theory it is believed that the modification of the fibers according to the present invention will increase the dispersity of the fibers when mixed with a second polymer leading to reduced number of fiber pullouts or debonding i.e. the matrix does not adhere properly to the fiber.

The products have good gas barrier properties such as oxygen and/or water vapor, barrier properties. It may also function as a liquid barrier for example for beverages, liquid food, oils, shampoos, soap or water etc. The material is less sensitive to degradation from the moisture and could be used as extruded layers in a laminate for liquid packaging. Further, when a second polymer is used the strong interaction between the two different polymers is also believed to be beneficial for the barrier properties.

The product discloses water vapor permeability and oxygen permeability properties as shown in the examples confirming its suitability as a barrier. The water vapor permeability ($g*mm/m^2*kPa*24$ h) according to ASTM F1249-06, measured at a relative humidity (RH) of 50% and a temperature of 23° C., may be 100 or lower, or 80 or lower, or 50 or lower, or 30 or lower, or 10 or lower. The oxygen permeability ($g*\mu m/m^2*kPa*24$ h) according to ASTM D3985, measured at a relative humidity of 50% and a temperature of 23° C., may be 200 or lower, or 150 or lower, or 100 or lower, or 50 or lower. The present invention also provides products having low oxygen transmission rate (OTR). It was unexpected that the melt processed, injection molded, products exhibited such good mechanical and barrier properties since these processes tend to break down the fibers.

The barrier properties of the product make it suitable when employed in packaging applications, such as extrusion coated layers and molded opening devices, closures and caps.

The Method of Melt-Processing

The modification of the cellulose fibers may be done according the method described in PCTSE2016/050663 which is hereby incorporated by reference.

The material to be melt-processed comprises modified cellulose fibers and optionally one or more second polymer. The modified cellulose may be provided in any suitable form such as paper, a powder, particles or pellets. Any mixing of the modified cellulose with a second polymer may be done in any suitable way. According to an embodiment, the modified cellulose may be compounded with a thermoplastic polymer as a masterbatch compound, for example in the form of particles or pellets.

The material may then be allowed to sorb moisture or water. The sorption may be done by leaving the material in a moisture-containing environment for a sufficient period of time, until sufficient amount of moisture or water has been sorbed by the material. The moisture containing environment may be a container with steam. The material may also sorb water by adding water to the material or by submerging the material into water for a sufficient period of time. Cellulose will sorb less moisture or water if the temperature during the sorption is increased and therefore the temperatures should not be increased too much. In one embodiment the sorption is done at 30° C. or lower such as at room temperature. The relative humidity (RH) during the adsorption may be 30-100% such as 50-99% or 70-95%. The material may be left in the moisture-containing environment for at least 5 minutes, or at least 15 minutes, or at least 30 minutes or at least 1 hour, or at least 2 hours. The material may be dipped in water or submerged in the water. In one embodiment the material is dipped or submerged in water for at least 10 seconds or at least 30 seconds, or at least 1 minute. In another embodiment the material is dipped or submerged for 1-10 seconds. The sorption time is partly dependent on the amount of material and the method of adding moisture or water. In one embodiment the material is treated in the moisture-containing environment having a relative humidity of 70-100% for at least 10 minutes. The moisture content of the material after this step may be 5-40 wt % such as 10-30 wt %.

By allowing the material to sorb moisture, the material may be more easily melt-processed since lower temperature and less force is needed. Furthermore the sorption is believed to inhibit discoloration during processing since the processing temperature may be lowered. A material that is not allowed to sorb moisture should preferably have a high degree of modification in order to facilitate the melt-processing of high-cellulose-content material. For example, dry processing (i.e. material that has not been allowed to sorb any moisture of water) at a cellulose content of at least 70% would preferably have a degree of modification of at least 30%, or at least 40%, or at least 50%, or at least 60% but preferably less than 95%, or less than 90%, or less than 80% or less than 70%. In one embodiment the degree of modification is 30-60% such as 40-50%. The material may have a high degree of modification as well as have been allowed to sorb moisture. The use and amount of a second polymer may also affect the melt processing properties.

The material may then be compounded or melt-processed at 60-200° C., depending on the properties of the material, using any suitable technique such as a melt-screw extruder or a twin-screw extruder. During the compounding or melt-processing the temperature may be high enough in order to make the material flow. The compounding or melt-processing may be described as a melt process where the temperature is high enough to melt or impart the material with a melt-like state, or make it soft enough to make it flow. For compounding of material that has been allowed to sorb moisture, a lower temperature may be used such 60-100° C. or 70-90° C. For dry material, i.e. material that has not been allowed to sorb moisture or water, a temperature of 120-160° C. may be used such as 130-150° C. Compounding of the material may be done during 5-10 minutes. Lower temperatures are sometimes more preferred since it reduces the risk of discoloration.

The material is melt-processed, for example, through injection molding, extrusion, extrusion casting, extrusion injection molding, extrusion compression molding or extrusion coating. In one embodiment the product is melt-processed by extrusion and/or injection molding.

In one embodiment the product is prepared by first compounding the material. The compounded material is then converted into particles or granules of suitable size, for example by cutting or grinding. The granules are then extruded using an extrusion screw and pressed through a nozzle and into a mold or into a strand or a film.

By extruding a film of the material onto a cooling roller or onto a substrate which is arranged on a roller extruded films or coated substrates may be prepared. Extrusion cast films may be stretched in any direction in order to align the fibers or the polymeric chains, for the purpose of improving various properties, such as mechanical properties, of the films.

When the material is injection molded it may first be compounded in a separate extruder or it may be added to the injection molding apparatus directly optionally together with the optional second polymer and the optional additives. The injection molding may be one step in a production line where the product is injection molded directly into place, so called in-line injection molding.

The melt-processing is done at a temperature suitable for the specific material composition, depending on the glass transition temperatures and/or the melting temperature. For example injection molding may be done at a temperature of 100-150° C. such as 120-130° C. for a material comprising modified cellulose fibers and poly(ethylene acrylic acid). If the cellulose has an increased moisture content, the temperature can be lowered.

The material to be processed may further contain any suitable additive such as a plasticizer, cross-linking agent, compatibilizer, filler, defoamer or pigment. However the material may also be essentially free from any additive. In one embodiment the material is essentially free from any plasticizer besides from optional water or moisture from the sorption step. In another embodiment the material is essentially free from any compatibilizer. In one embodiment the product is essentially free from any cross-linking agents.

EXAMPLES

Example 1

Fibres

Dried bleached kraft fibers (K46) were provided by SCA AB (Östrand pulp mill, Sweden). Before use, the fibers were soaked in water and disintegrated and then mechanically beaten in a Voith mill to an energy input of 160 Wh/kg (about 30 SR).

Chemicals

Sodium (meta)periodate for the oxidation of cellulose, isopropanol (≥99.8% purity) used as radical scavenger and hydroxylamine hydrochloride for the determination of the degree of oxidation. Sodium borohydride was used to reduce dialdehyde cellulose to dialcohol cellulose. These and all other chemicals, such as hydrochloric acid and sodium hydroxide, were all of analytical grade.

Oxidation of Cellulose

Under stirring, 5.4 gram of sodium periodate per gram of fiber was added to a 4 g/l fiber suspension containing 6.3% isopropanol (by volume) as radical scavenger to prevent side reactions and chain scission. To further prevent chain scission, the oxidation reactions were performed in the dark for 16 h, 24 h or 32 h before the reaction was terminated by filtration and thorough washing with deionized water. The degree of conversion to dialdehyde cellulose, assuming pure cellulose as starting material, was determined to be 32%, 46% and 55% (hereafter called Fiber32, Fiber46 and Fiber55), respectively, by reaction with hydroxylamine hydrochloride and titration with sodium hydroxide according to an earlier described procedure.

Reduction of Cellulose

The fibers were then suspended to 4 g/l and the dialdehyde cellulose formed was reduced to dialcohol cellulose by adding 0.5 g sodium borohydride per gram of fibers. To limit the pH increase to about pH 10 upon addition of sodium borohydride, monobasic sodium phosphate was added together with the borohydride in an amount corresponding to 0.01 M. The reduction time was kept constant at 4 h (analysis shows no measurable content of remaining aldehydes after this time), followed by filtration and thorough washing.

Paper Preparation

Handsheets with an approximate grammage of 150 g m$^{-2}$ were prepared using tap water in a Rapid Kothen sheet former (Paper Testing Instruments, Austria). The sheets were dried at 93° C. under a reduced pressure of 95 kPa. The sheets were then stored at 23° C. and 50% RH until further testing/use.

Example 2

In order to test the effect of scale-up of the modification and to have enough material for longer test series, the following experimental set up was used:

The modification was done as described in Example 1 but instead of a dry content of 0.4% it was increased to 4%, the amount of oxidation agent was reduced to 1.4 g (NaIO$_4$)/g fiber and the temperature was raised to 50° C. in order to reduce the reaction time to 3-4 hours. The degree of oxidation was determined by carbonyl content analysis to be 38% (these fibers are hereafter called Fiber38).

During the reduction step the amount of reducing agent was reduced from 0.5 g/g fiber to 0.2 g/g fiber (full reduction of aldehydes was measured by carbonyl content determination).

Example 3

In order to obtain a greater understanding of the hygro- and thermo-mechanical properties of the modified cellulose, dynamical mechanical thermal analysis (DMTA) was conducted over a select number of relative humidities. All DMTA tests were conducted under controlled environment utilizing a Q800 DMTA from TA Instruments with a moisture- and temperature-controlled chamber. Approximately constant relative humidity (±2.5% at all data points in this manuscript except for the DMTA results at 113° C. and high humidity, which have a maximum±12% error in humidity) was maintained during each test (0%, 50%, 60%, and 70% RH). The desired relative humidity and a temperature of 10° C. was achieved and then maintained over the first 120 min of the test. After 120 min had passed, the temperature was swept from 10 to 113° C. for 206 min, held at 113° C. for 30 min, swept from 113 to 10° C. for 206 min, and then held at 10° C. for 30 min. This temperature cycle was conducted three times or until the sample failed. Various output parameters were obtained, including relative humidity near the surface of the sample, storage modulus, and loss modulus. The data from the first temperature cycle was not utilized due to hysteresis effects (i.e. the first and subsequent cycles showed slightly different results). Therefore, only the second and subsequent cycles were utilized in the data analysis. The peaks in loss modulus during the temperature sweeps were defined as the apparent glass transition temperature.

Figure 1:
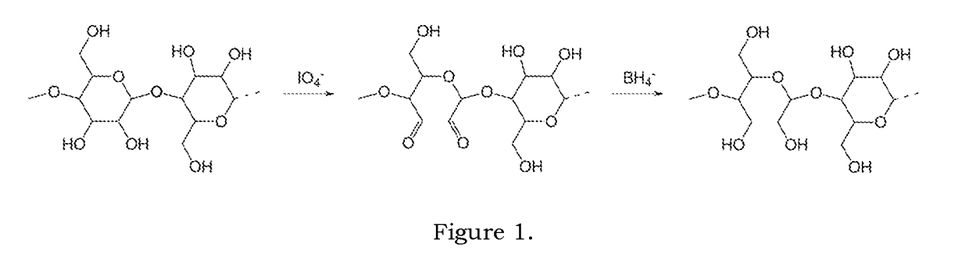
FIG. 1, schematic reaction scheme of the modification of cellulose into dialcohol cellulose.
Figure 2:
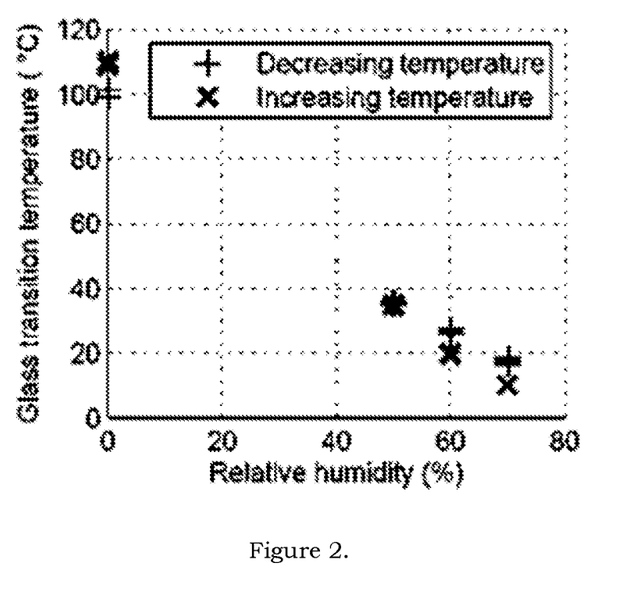
FIG. 2, Dynamical mechanical thermal analysis (DMTA) measurements disclosing apparent glass transition temperature at various relative humidity conditions.

The results are disclosed in FIG. 2.

Example 4

Processing conditions of dialcohol-cellulose-fiber (hereafter called fiberX, where X denotes the degree of modification)-based composites.

Instruments:

DSM Micro compounder 5 ml: MC 5 (DSM, Xplore Instruments BV, The Netherlands)

Thermo Scientific HAAKE MiniJet Pro-Thermo Fisher Scientific

Cellulose Fiber and EAA Assisted Processing:

Material obtained in Example 1 and 2 were used to prepare injection molded products. Composites with different fiber and EAA content were prepared as well as 100% fiber product. The different contents are seen in tables 1 to 4.

Compounding

T=120° C.

v=30 or 60 rpm t=5 min

Injection

T=120-140° C.

Pi=1000 bar t=≈10 min

The force required during the compounding (extrusion) for the different materials is shown in table 1, 2 and 5.

DMTA testing was conducted according to by ASTM D882: Alpha transition temperatures (Tα) as peak value of loss modulus (E"); Damping factor as peak value of tan delta; Storage Modulus (E') at −20° C. and at 25° C. (RT).

TABLE 1

Table over force needed during injection molding of material containing different amounts (10-90 wt %) of dialcohol cellulose.

| SAMPLE | FORCE [N] |
|---|---|
| EAA 60 rpm | 1500 |
| 10% Fiber 38/EAA 60 rpm | 1700 |
| 30% Fiber 38/EAA 60 rpm | 2100 |
| 50% Fiber 38/EAA 60 rpm | 2600 |
| 70% Fiber 38/EAA 60 rpm | 4000 |
| 90% Fiber 38/EAA 30 rpm | 4800 |

TABLE 2

Table over force needed during compounding (extrusion) of material containing 70 wt % of dialcohol cellulose with increasing degree of conversion to dialcohol cellulose.

| SAMPLE | FORCE [N] |
|---|---|
| EAA | 1500 |
| 70% Fiber32/EAA 30 rpm | 4100 |
| 70% Fiber46/EAA 60 rpm | 3100 |
| 70% Fiber55/EAA 60 rpm | 2600 |

TABLE 3

Table over mechanical properties of materials containing different amounts of dialcohol cellulose.

| SAMPLE | E' at −20° C. [MPa] | E' at RT [MPa] | Damping factor [° C.] | Tα [° C.] |
|---|---|---|---|---|
| EAA 60 rpm | 1530 | 220 | 27.7 | 8.8 |
| 10% Fiber 38/ EAA 60 rpm | 2030 | 520 | 28.5 | 9.8 |
| 30% Fiber 38/ EAA 60 rpm | 2810 | 987 | 29.7 | 14.5 |
| 50% Fiber 38/ EAA 60 rpm | 3900 | 1800 | 42.4 | 19.1 |

TABLE 3-continued

Table over mechanical properties of materials containing different amounts of dialcohol cellulose.

| SAMPLE | E' at −20° C. [MPa] | E' at RT [MPa] | Damping factor [° C.] | Tα [° C.] |
|---|---|---|---|---|
| 70% Fiber 38/ EAA 60 rpm | 6790 | 3190 | 51.0 | 22.2 |
| 90% Fiber 38/ EAA 30 rpm | 9170 | 4370 | 68.4 | 27.1 |

TABLE 4

Table over mechanical properties of materials containing different amounts of dialcohol cellulose.

| SAMPLE | $E_{Young}$ [MPa] | $\sigma_{yield}$ [MPa] | $\sigma_{break}$ [MPa] | $\varepsilon_{break}$ [%] | Energy$_{break}$ [Jg$^{-1}$] |
|---|---|---|---|---|---|
| EAA 60 rpm | 110 | 2.7 | 10.6 | 174.6 | 5.50 |
| 10% Fiber 38/ EAA 60 rpm | 380 | 4.3 | 12.5 | 56.3 | 1.71 |
| 30% Fiber 38/ EAA 60 rpm | 980 | 8.4 | 12.7 | 27.4 | 1.11 |
| 50% Fiber 38/ EAA 60 rpm | 1900 | 14.3 | 19.2 | 7.2 | 0.31 |
| 70% Fiber 38/ EAA 60 rpm | 3210 | 19.0 | 24.2 | 5.3 | 0.25 |

H$_2$O Assistance:
100% fiber, 38% (Fiber 38) and 55% (Fiber 55) conversion to dialcohol cellulose, conditioned till constant moisture content at RH>90%
Compounding
  T=80° C.
  v=60 rpm
  t=5 min
Injection
  T=120-140° C.
  Pi=1000 bar
  t≈10 min
The materials were either extruded (compounded) dry or wet (RH90%) at 120° C. or 80° C. at 30 or 60 rpm and injected. The injected samples were then dried at 105° C. for 2 hours. The stress-strain measurements were conducted using an Instron 5944 at 23° C. and 50% RH.

TABLE 5

Table over force needed during compounding (extrusion) of material containing 100 wt % of Fiber 55- dry and wet samples and wet Fiber 38.

| SAMPLE | FORCE [N] |
|---|---|
| 100% Fiber55 dried 120° C. 30 rpm | 4900 |
| 100% Fiber55 RH > 90% 80° C. 60 rpm | 1500 |
| 100% Fiber38 RH > 90% 80° C. 60 rpm | 2000 |

TABLE 6

Tensile test for 100% Fiber55 - dry and wet samples.

| SAMPLE | $E_{Young}$ [GPa] | $\sigma_{yield}$ [MPa] | $\sigma_{break}$ [MPa] | $\varepsilon_{break}$ [%] |
|---|---|---|---|---|
| 100% Fiber55 dried 120° C. 30 rpm | 10.2 | — | 13.1 | 0.2 |
| 100% Fiber55 RH > 90% 80° C. 60 rpm | 12.2 | — | 5.5 | 0.1 |

As seen above, high cellulose fiber content material may be extruded and injection molded at a reasonable temperature without the addition of any additive such as plasticizer or compatibilizer. Furthermore, the obtained material also has good mechanical properties.

Example 5

Dense cellulose is known to be a good oxygen barrier, but not as good water vapor barrier. To assess the barrier properties of the melt-processed material, pieces of injection-molded material was hot-pressed between two smooth surfaces at a pressure in the approximate range of 15-50 MPa and further conditions according to table 5. The films formed were then masked using custom-designed, double-adhesive, aluminum foil masks and oxygen and water vapor transmittance was measured at 50% RH using a Mocon MOCON OX-TRAN® 2/21 and MOCON PermaTran-W 3/33, respectively. The material used was Fiber38. The test area was 2.5 cm$^2$. The results are shown in table 7.

TABLE 7

Measurements of barrier properties of 100 wt % modified cellulose (100 Fiber38) and materials of modified cellulose (Fiber38) and a second polymer (EAA or polyvinyl alcohol (PVA)) in different ratios. WVRT is Water Vapor Transmission Rate and OTR is Oxygen Transmission Rate.

| Material | Hotpressing (temp, time) | Thickness (um) | OTR[1] | O2 permeability[2] | WVTR[3] | Vapor permability[4] |
|---|---|---|---|---|---|---|
| 100 Fiber38 | 150° C., 5 + 2 min | 383 | 10 | 38 | 4.4 | 1.2 |
| 50/50 Fiber38/EAA | 90° C., 2.5 min | 437 | | | 268 | 83 |
| 50/50 Fiber38/EAA | 90° C., 2.5 min | 326 | | | 94 | 22 |
| 70/30 Fiber38/PVA | 150° C., 5 min | 465 | | | 1966 | 650 |
| 70/30 Fiber38/PVA | 150° C., 5 min | 756 | 11 | 82 | 171 | 92 |

TABLE 7-continued

Measurements of barrier properties of 100 wt % modified cellulose (100 Fiber38) and materials of modified cellulose (Fiber38) and a second polymer (EAA or polyvinyl alcohol (PVA)) in different ratios. WVRT is Water Vapor Transmission Rate and OTR is Oxygen Transmission Rate.

| Material | Hotpressing (temp, time) | Thickness (um) | OTR[1] | O2 permeability[2] | WVTR[3] | Vapor permability[4] |
|---|---|---|---|---|---|---|
| 70/30 Fiber38/EAA | 90° C., 3 min | 250 | 46 | 113 | | |
| 70/30 Fiber38/EAA | 90° C., 3 min | 332 | 115 | 377 | | |

[1](ml/(m2*24 h)
[2](ml*um/(m2*kPa*24 h)) ASTM D3985
[3](g/(m2*24 h)
[4](g*mm/(m2*kPa*24 h))

Example 6

A pilot production of the modified cellulose fiber material was performed by RISE Processum AB.

Pulp (39 kg, 4.5% of dry content) was added to a 50 liter stainless steel reactor with a mechanical stirrer and heated to 51° C. 2.5 liter of isopropanol was added followed by 2.5 kg of sodium periodate. The reaction mixture was stirred during 105 minutes. The reactor was emptied at the bottom and was filtered (FSI filter size 2) and was quickly washed with deionized water in order to lower the temperature and to remove the excess of periodate. The pulp or product was washed with deionized water until the wash water had a conductivity of less than 10 μS/cm.

The product was suspended in water and 7.5 kg of ice to a total weight of 37 kg. The cooled product was placed in the reactor and $NaBH_4$ (350 g in around 2 liter of water) was added during 3 minutes. The temperature was monitored to avoid temperature above 10° C. Stirring was continued for 1 hour and the reaction product was emptied from the bottom of the reactor. The reaction product was filtered using filter bags (FSI filter size 2) and was quickly washed with deionized water to remove remaining $NaBH_4$. The product was washed until the wash water conductivity was less than 10 μS/cm. The filtered and washed product was dewatered using a mechanical screw press to a dry content of 10-15%.

The carbonyl content after the oxidation step was determined to be 5.2 mmol/g and the total yield was 48.5%.

Example 7

Caps of the material obtained from Example 6 were prepare and measured concerning melt flow index and OTR (Oxygen Transmission Rate). The results are shown in Table 8 and 9.

The caps (80 wt % modified cellulose and 20 wt % EAA) were injection molded using a BOY 12A from Dr Boy GmbH & Co. The injection molding was done at a pressure of 2200-2400 bar, at a temperature of 130° C. and at an injection speed of 14 ccm/sec.

Colored caps were also injection molded using 2-3 wt % of pigment.

TABLE 8

Melt flow index measurements of virgin fibers, MFC and modified cellulose/EAA (without pigment).

| Property | Virgine cellulose fibers | MFC* | Modified cellulose and 20 wt % EAA |
|---|---|---|---|
| MFR.** 190° C.-5 kg | Does not melt | Does not melt | 5 g/min |

Melt flow was tested according to ISO 1133: 1999
*MFC is Microfibrillated cellulose
**MFR—Melt flow ratio OTR measurements were performed using the same instrument as described above. The samples for OTR measurements were glued with epoxy on to a special holder and measured at 3 different climates at an oxygen level of 21%: 23° C. and 50% RH (21% 23° C./50% RH), 23° C. and 80% RH (21% 23° C./80% RH) and 38° C. and 90% RH (21% 38° C./90% RH). Readings were taken when OTR reached equilibrium. Commercially available caps of LDPE (Low Density Polyethylene) were used as reference. The given thickness is the top, the edges are somewhat thicker (0.88 mm and 0.86 mm).

TABLE 9

Oxygen Transmission Rate measurements for sample of 0.8 mm thickness (average). The unit is cc/part/24 h

| Climate | Modified cellulose and 20% EAA | LDPE |
|---|---|---|
| 21% O2 38° C./90% RH | 0.016 | 0.184 |
| 21% O2 23° C./80% RH | 0.001 | 0.078 |
| 21% O2 23° C./50% RH | 0.001 | 0.084 |

The caps showed very good OTR results which is unexpected since the injection molding is quite a harsh method for the fibers.

Example 8

100 wt % of the modified cellulose fiber material (dry state) obtained in Example 6 was melt extruded using a BOY 12A, from Dr Boy GmbH Co, at a temperature of 130° C., and a pressure of 2200-2400 bar.

The invention claimed is:
1. A material comprising cellulose fibers wherein the cellulose fibers are at least partly modified to contain dialcohol cellulose and wherein the amount of the modified cellulose fibers in the material is more than 60 wt %; and wherein the degree of conversion of the at least partly modified cellulose to dialcohol cellulose, based on the total number of oxidizable C2-C3 bonds in the cellulose material, is at least 10% but less than 70%;

wherein the material is an extruded layer or film.

2. The material according to claim 1 wherein the amount of the modified cellulose fibers in the material is 61 wt % or more.

3. The material according to claim 1 wherein the amount of the modified cellulose fibers in the material is less than 100 wt % and wherein the material further contains a thermoplastic polymer.

4. The material according to claim 3 wherein the material further contains a polyolefin wherein the polyolefin is selected from polyethylene or polypropylene.

5. The material according to claim 3 wherein the material further contains a natural polymer wherein the natural polymer is natural cellulose, hemi cellulose or starch or a derivative of natural cellulose, hemi cellulose or starch.

6. The material according to claim 1 wherein the degree of conversion of the at least partly modified cellulose to dialcohol cellulose, based on the total number of oxidizable C2-C3 bonds in the cellulose material is at least 20%.

7. A method of preparing a product wherein the method comprises;
a) providing a material comprising cellulose fibers wherein the cellulose fibers are at least partly modified to contain dialcohol cellulose and wherein the amount of the modified cellulose fibers in the material is more than 60 wt %; and
wherein the degree of conversion of the at least partly modified cellulose to dialcohol cellulose, based on the total number of oxidizable C2-C3 bonds in the cellulose material, is at least 10% but less than 70%;
b) melt-processing the material into the product by extrusion, extrusion casting, extrusion coating or by extruding a film of the material onto a cooling roller or onto a substrate which is arranged on a roller; and
wherein the modification of the cellulose fibers is done in two steps where the first step is oxidizing the cellulose on/in the fibrils constituting the cellulose fibers to dialdehyde cellulose to a desired extent and then reducing the dialdehyde groups on the cellulose to dialcohol cellulose, and wherein the oxidation is mainly heterogeneous reaction performed in a fiber suspension.

8. The method according to claim 7 wherein the degree of conversion of the dialcohol cellulose is at least 20%.

9. The method according to claim 7 wherein the melt-processing is extrusion.

10. The method according to claim 7 wherein the material is allowed to sorb moisture or water and wherein the injection molding or extrusion is done at a temperature of 60-100° C.

11. The method according to claim 7 wherein the melt processing is done at a temperature of at least of at least 120° C.

12. The material according to claim 1 wherein the amount of the modified cellulose fibers in the material is 75 wt % or more.

13. The material according to claim 1 wherein the amount of the modified cellulose fibers in the material is 90 wt % or more.

14. The material according to claim 1 wherein the amount of the modified cellulose fibers in the material is less than 100 wt % and wherein the material further contains a thermoplastic polymer wherein the thermoplastic polymer is selected from natural polymer, a natural polymer derivative, a polyolefin, a polyethylene vinyl alcohol co-polymer a polyester, a polyacrylic acid or a polyamide, or a co-polymer or a mixture of two or more of said polymers.

15. The material according claim 1 wherein the degree of conversion of the at least partly modified cellulose to dialcohol cellulose, based on the total number of oxidizable C2-C3 bonds in the cellulose material is at least 30%.

16. The material according claim 1 wherein the degree of conversion of the at least partly modified cellulose to dialcohol cellulose, based on the total number of oxidizable C2-C3 bonds in the cellulose material is from 32% to 40%.

17. The method according to claim 7 wherein the degree of conversion of the dialcohol cellulose is at least 30%.

18. The material according to claim 1 wherein the amount of the modified cellulose fibers in the material is 95 wt % or more.

19. The material according to claim 1 wherein the amount of the modified cellulose fibers in the material is 100 wt %.

20. The material according to claim 1 wherein the material is part of a cap, closure device, package top, openings, toy, container, construction parts, interior decoration or automotive parts.

* * * * *